(12) United States Patent
Takahashi

(10) Patent No.: US 8,937,973 B2
(45) Date of Patent: Jan. 20, 2015

(54) TRANSMITTING DEVICE, RECEIVING DEVICE, COMMUNICATION SYSTEM, TRANSMISSION METHOD, RECEPTION METHOD, AND PROGRAM

(75) Inventor: Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 142 days.

(21) Appl. No.: 13/592,778

(22) Filed: Aug. 23, 2012

(65) Prior Publication Data

US 2013/0063659 A1 Mar. 14, 2013

(30) Foreign Application Priority Data

Sep. 9, 2011 (JP) ................................. 2011-197258

(51) Int. Cl.
*H04J 3/06* (2006.01)
*H04N 21/43* (2011.01)
*H04N 5/232* (2006.01)

(52) U.S. Cl.
CPC ........ *H04N 21/4307* (2013.01); *H04N 5/23206* (2013.01)
USPC .......................................................... 370/516

(58) Field of Classification Search
USPC .......................................... 370/516; 348/43
See application file for complete search history.

(56) References Cited

U.S. PATENT DOCUMENTS

| 5,274,680 | A  | * | 12/1993 | Sorton et al. ................. | 375/371 |
| 5,721,738 | A  | * | 2/1998  | Kubota et al. ................ | 370/508 |
| 7,023,883 | B1 | * | 4/2006  | Lui et al. ..................... | 370/503 |
| 7,619,972 | B2 | * | 11/2009 | Gregory ...................... | 370/231 |
| 2004/0052209 | A1 | * | 3/2004 | Ortiz ............................ | 370/230 |
| 2012/0002011 | A1 | * | 1/2012 | Inoue et al. .................... | 348/43  |
| 2013/0322276 | A1 | * | 12/2013 | Pelletier et al. .............. | 370/252 |

FOREIGN PATENT DOCUMENTS

JP 2006-325020 11/2006

OTHER PUBLICATIONS

U.S. Appl. No. 13/493,306, filed Jun. 11, 2012, Takahashi.

* cited by examiner

*Primary Examiner* — Hassan Kizou
*Assistant Examiner* — Abdullahi Ahmed
(74) *Attorney, Agent, or Firm* — Oblon, Spivak, McClelland, Maier & Neustadt, L.L.P.

(57) ABSTRACT

There is provided a transmitting device including a packet signal generation unit configured to generate a packet signal of a video; a transmitting unit configured to transmit the packet signal via an asynchronous transmission network; a timing generation unit configured to generate a video frame synchronization signal on the basis of a reference signal acquired from a reference signal source; and a timing adjustment unit configured to, on the basis of the frame synchronization signal, perform adjustment so that a transmission timing for the packet signal is different from a transmission timing for a packet signal at another transmitting device.

16 Claims, 7 Drawing Sheets

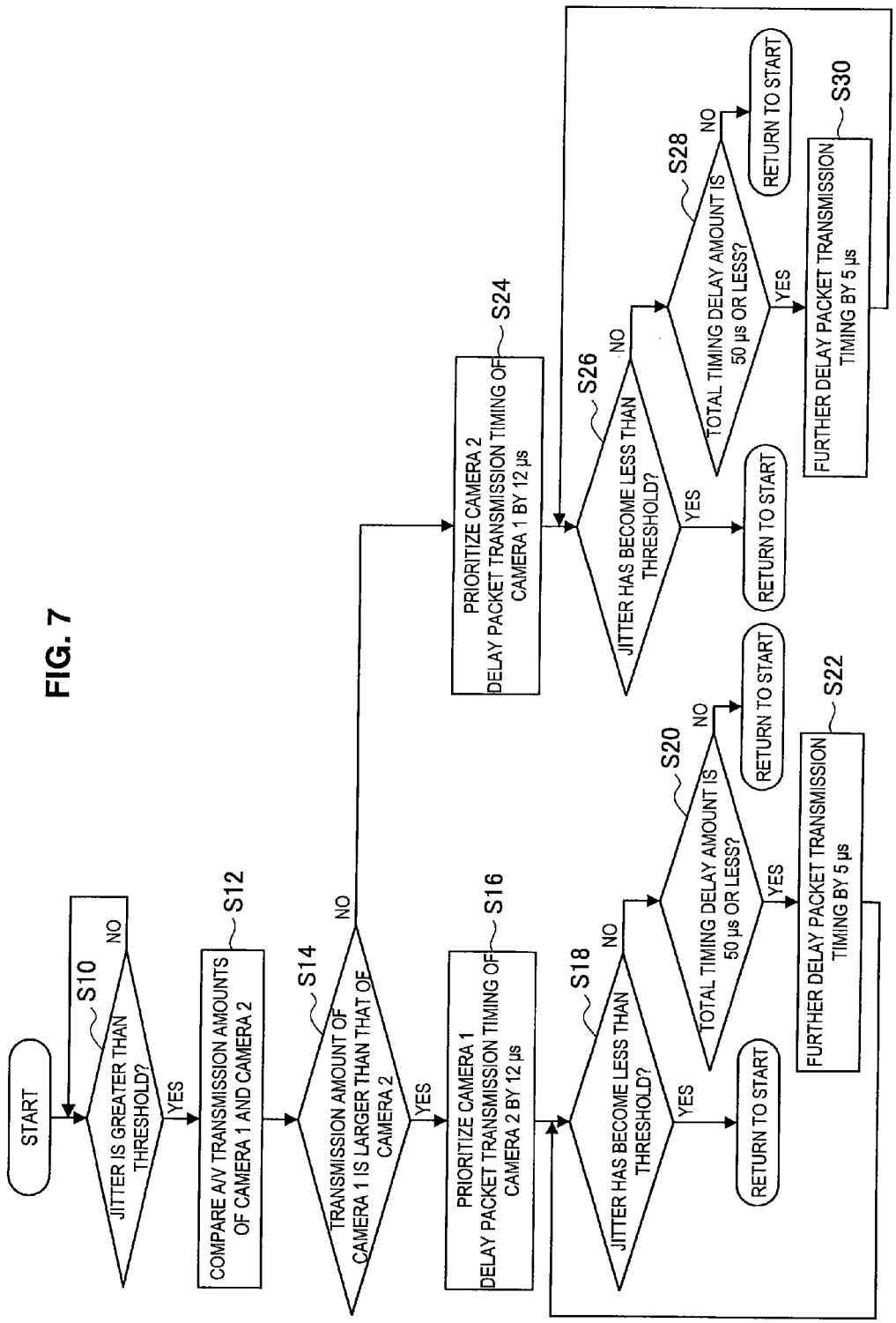

TRANSMITTING DEVICE, RECEIVING DEVICE, COMMUNICATION SYSTEM, TRANSMISSION METHOD, RECEPTION METHOD, AND PROGRAM

BACKGROUND

The present disclosure relates to a transmitting device, a receiving device, a transmission method, a communication system, a reception method, and a program.

A system that transmits videos of cameras via an asynchronous packet transmission network such as Ethernet has been known as a scheme of transmitting live videos. For example, JP 2006-325020A discloses a technique that is based on the premise of reducing jitter in the case of simultaneously receiving videos from network cameras via the Internet and reproducing the videos.

SUMMARY

When video signals sent from a plurality of cameras are transmitted via a packet transmission network such as Ethernet, if the video signals of the plurality of cameras are collectively transmitted to a camera receiver through a single cable via a switch called a network switch, the system configuration can be simplified.

However, if video signals of a plurality of cameras are simultaneously input to the network switch, as the clocks of the cameras are synchronized, it is presumed that when the video signals of the plurality of cameras are collectively transmitted through a single cable by the switch, the timings of packet signals of the cameras would be synchronized. In such a case, the following two cases would arise: a case where a packet of one camera is preferentially output from the switch first, and a case where a packet of the other camera is preferentially output from the switch first. Therefore, as a packet signal of one camera is delayed than a packet signal of the other camera, it is presumed that network jitter would increase.

In view of the foregoing, it is desirable to reduce network jitter in a system that collectively sends video signals of a plurality of cameras to a camera receiver.

According to an embodiment of the present disclosure, there is provided a transmitting device including a packet signal generation unit configured to generate a packet signal of a video; a transmitting unit configured to transmit the packet signal via an asynchronous transmission network; a timing generation unit configured to generate a video frame synchronization signal on the basis of a reference signal acquired from a reference signal source; and a timing adjustment unit configured to, on the basis of the frame synchronization signal, perform adjustment so that a transmission timing for the packet signal is different from a transmission timing for a packet signal at another transmitting device.

According to another embodiment of the present disclosure, there is provided a receiving device including a receiving unit configured to receive a packet signal of a video via an asynchronous transmission network; a jitter measuring unit configured to measure jitter of the packet signal in the asynchronous transmission network; a timing adjustment unit configured to generate, on the basis of the jitter, a control signal for performing adjustment so that a transmission timing for the packet signal at a transmitting device that transmits the packet signal is different from a transmission timing at another transmitting device; and a transmitting unit configured to transmit the control signal to the transmitting device.

According to still another embodiment of the present disclosure, there is provided a communication system including a plurality of transmitting devices, each transmitting device including a packet signal generation unit configured to generate a packet signal of a video, a transmitting unit configured to transmit the packet signal via an asynchronous transmission network, a timing generation unit configured to generate a video frame synchronization signal on the basis of a reference signal acquired form a reference signal source, and a timing adjustment unit configured to perform adjustment so that a transmission timing for the packet signal is different from a transmission timing for a packet signal at another transmitting device on the basis of the frame synchronization signal; a switch configured to receive the packet signals transmitted from the plurality of transmitting devices and transmit the received packet signals via a single cable; and a receiving device including a receiving unit configured to receive the packet signals transmitted from the switch.

According to the embodiments of the present disclosure, it is possible to reduce network jitter in a system that collectively sends video signals of a plurality of cameras to a camera receiver.

BRIEF DESCRIPTION OF THE DRAWINGS

FIG. 7 is a flowchart showing a process of a feedback loop in a camera receiver.

DETAILED DESCRIPTION OF THE EMBODIMENTS

Figure 1:
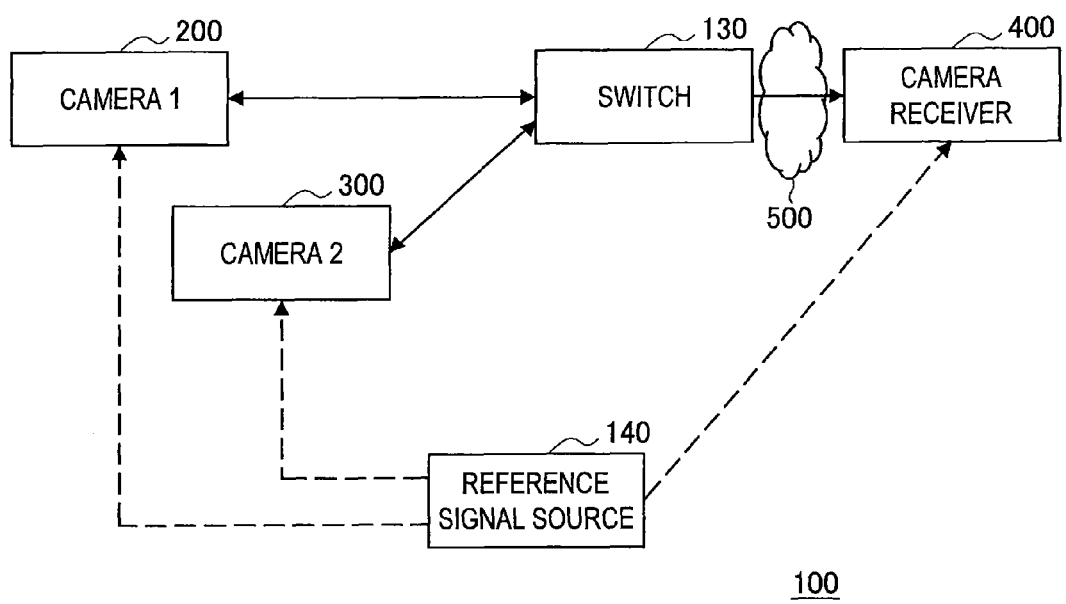
FIG. 1 is a schematic configuration diagram showing a system that transmits videos of cameras via an asynchronous packet transmission network such as Ethernet.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. First Embodiment
1-1. Base Technology
1-2. Example of Packet Transmission of this Embodiment
1-3. Exemplary Configuration of Camera
2. Second Embodiment
2-1. Summary of Second Embodiment
2-2. Exemplary Configuration of Camera
2-3. Exemplary Configuration of Camera Receiver
2-4. Process of Feedback Loop in Camera Receiver
2-5. Method of Determining Priorities
2-6. Dispersion Amount of Packet Transmission Timings

1. First Embodiment

1-1. Base Technology

First, a base technology of the present disclosure will be described. FIG. 1 is a schematic configuration diagram showing a communication system 100 that transmits videos of cameras via a packet transmission network such as Ethernet. The communication system 100 includes a camera (1) 200, a camera (2) 300, a network switch 130, a reference signal source 140, and a camera receiver (camera control unit) 400. Each component is connected via an asynchronous packet transmission network 500 such as Ethernet. The camera (1) 200, the camera (2) 300, and the camera receiver 400 operate in synchronization with signals sent from the reference signal source 140. In addition, each of the camera (1) 200 and the camera (2) 300 generates an internal clock (time information) from the reference signal sent from the reference signal source 140. Therefore, the clock in each of the camera (1) 200 and the camera (2) 300 is, for example, information on the universally standardized date and time (date, hour, minute, second). This clock can be adjusted to a correct time using a technology such as NTP (Network Time Protocol), GPS (Global Positioning System), or RTC (Real Time Clock). Accordingly, the clocks of the camera (1) 200 and the camera (2) 300 are adjusted so that they are accurately synchronized.

Each of the camera (1) 200 and the camera (2) 300 captures a video such as a live video and transmits a video signal, an audio signal, or the like to the network switch 130. The network switch 130 collectively transmits A/V packets and control packets sent from the camera (1) 200 and the camera (2) 300 to the camera receiver 400 via a single cable. The camera receiver 400 decodes the signals sent from the camera (1) 200 and the camera (2) 300, and transmits them to a video switcher of a rear stage (not shown). The video switcher adequately switches between the videos of the camera (1) 200 and the camera (2) 300 and the like on the basis of switching information input from the outside, and outputs the video to a display device or the like. According to such a configuration, video signals of the plurality of cameras 200 and 300 can be processed with a single camera receiver 400. Thus, it is not necessary to provide a camera receiver that corresponds to each camera. Thus, it is possible to significantly simplify the system configuration when providing a plurality of cameras.

Figure 2:
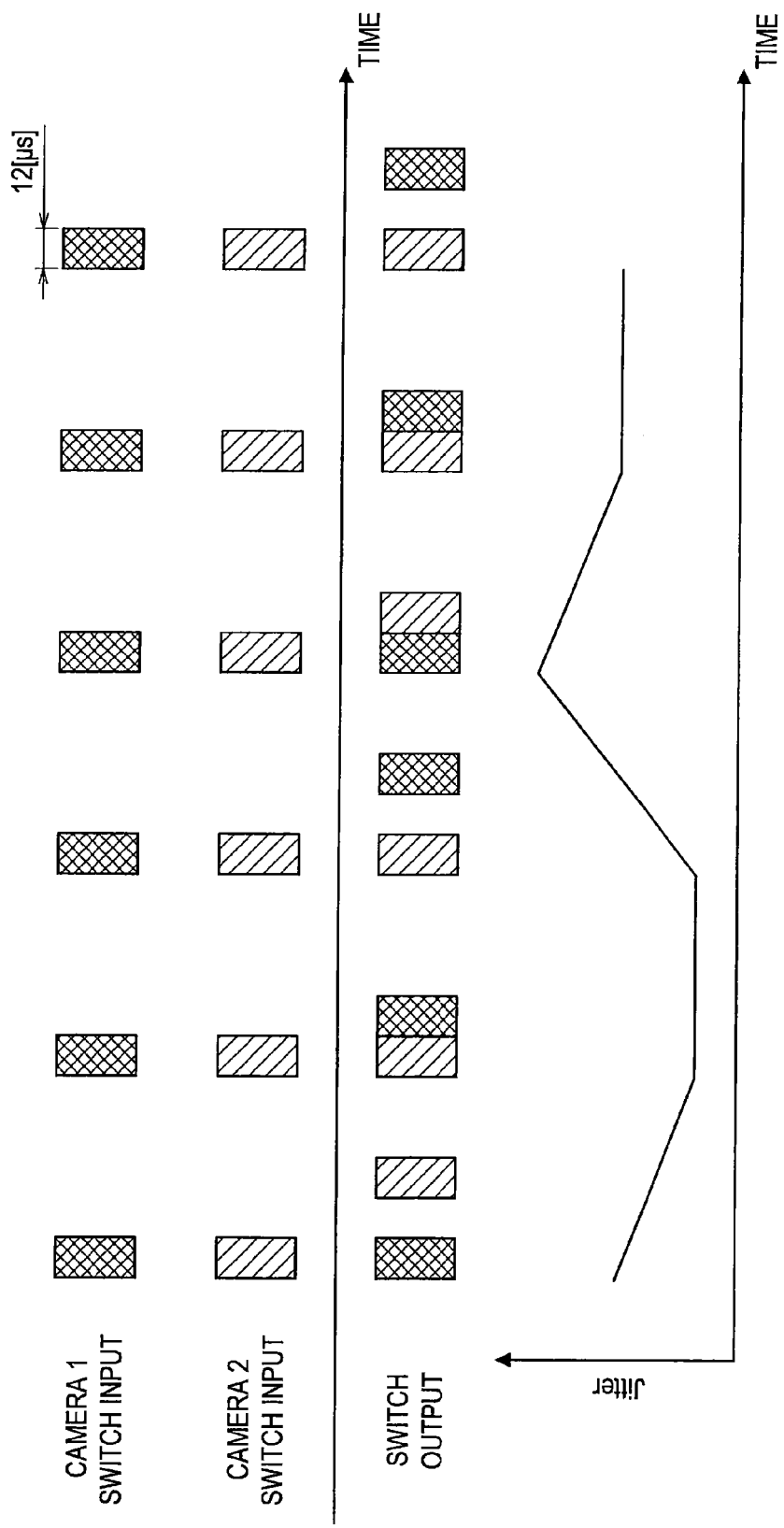
FIG. 2 is a timing chart showing the relationship among packet signals input to a network switch from a camera (1) and a camera (2), a packet signal output from the network switch, and network jitter.

FIG. 2 is a timing chart showing the relationship among packet signals input to the network switch 130 from the camera (1) 200 and the camera (2) 300, a packet signal output from the network switch 130, and network jitter. In FIG. 2, the "camera 1 switch input" and the "camera 2 switch input" indicate packet signals that are input to the network switch 130 from the camera (1) 200 and the camera (2) 300, respectively. In addition, the "switch output" indicates a packet signal output from the network switch 130. A packet signal includes, for example, a video signal acquired on the side of the camera (1) 200 or the camera (2) 300, an A/V packet of an audio signal, and a control packet including control information.

The camera (1) 200 and the camera (2) 300 are synchronized by reference signals. Thus, the advance amount of frame synchronization signals (Frame Sync.) described below are about equal. Therefore, frames of packet signals input to the network switch 130 from the camera (1) 200 and the camera (2) 300 have almost the same temporal timing of the compartmental position. In addition, clocks generated by the camera (1) 200 and the camera (2) 300 from signals sent from the reference signal source 140 are also synchronized. Therefore, as shown in FIG. 2, the timings of A/V packets and control packets output from the camera (1) 200 and the camera (2) 300 are synchronized.

Packets from the camera (1) 200 and the camera (2) 300 arrive at the network switch 130 almost at the same timing. Therefore, the network switch 130, when collectively transmitting A/V packets and control packets of the two cameras to the camera receiver 400 through a single cable as shown in the "switch output" of FIG. 2, outputs the packets of one camera first, and outputs the packets of the other camera second.

In this case, as shown in FIG. 2, there are two cases where the packets of the camera (1) 200 are preferentially output from the network switch 130 first, and where the packets of the camera (2) 300 are preferentially output from the network switch 130 first.

Herein, provided that the packet size is 1500 bytes, the transmission time for one packet will be about 12 µs. As shown in FIG. 2, suppose a case where packets of the camera (1) 200 and the camera (2) 300 arrive at the network switch 130 at the same timing. In such a case, there are two cases where the network switch 130 preferentially outputs the packets of the camera (1) 200 first and outputs the packets of the camera (2) 300 12 µs later, and where, conversely, the network switch 130 preferentially outputs the packets of the camera (2) 300 first and transmits the packets of the camera (1) 200 12 µs later.

When the system in FIG. 1 was actually constructed, the network switch 130 was actually connected thereto, and measurement was conducted, it was found that depending on the type of the network switch 130, there is not only a case where the network switch 130, immediately after transmitting packets of one camera, transmits packets of the other camera, but also a case where the network switch 130, after an interval of 12 µs after transmitting packets of one camera, transmits packets of the other camera. In such a case, a discrepancy of a total of 24 µs (=12 µs+12 µs) is generated between the packet signals of the two cameras.

Such discrepancy is observed as network jitter as shown by the characteristics on the lower part of FIG. 2, resulting in deterioration of the A/V quality. Jitter shown in FIG. 2 shows jitter of the camera (1) 200. It is found that when the packets of the camera (1) 200 are delayed than the packets of the camera (2) 300, the jitter would increase, and with an increase in the amount of discrepancy (12 µs→24 µs), the jitter would further increase.

In order to reduce the influence of the jitter, it would be possible to absorb the jitter by providing a sufficient buffer on the receiving side. However, if a buffer is provided, an A/V signal and a control signal would be delayed.

Thus, this embodiment proposes a packet transmission-type synchronization camera system that can reduce network jitter, which is caused by a collision of packets in the network switch 130, to the extent possible.

1-2. Example of Packet Transmission of this Embodiment

Figure 3:
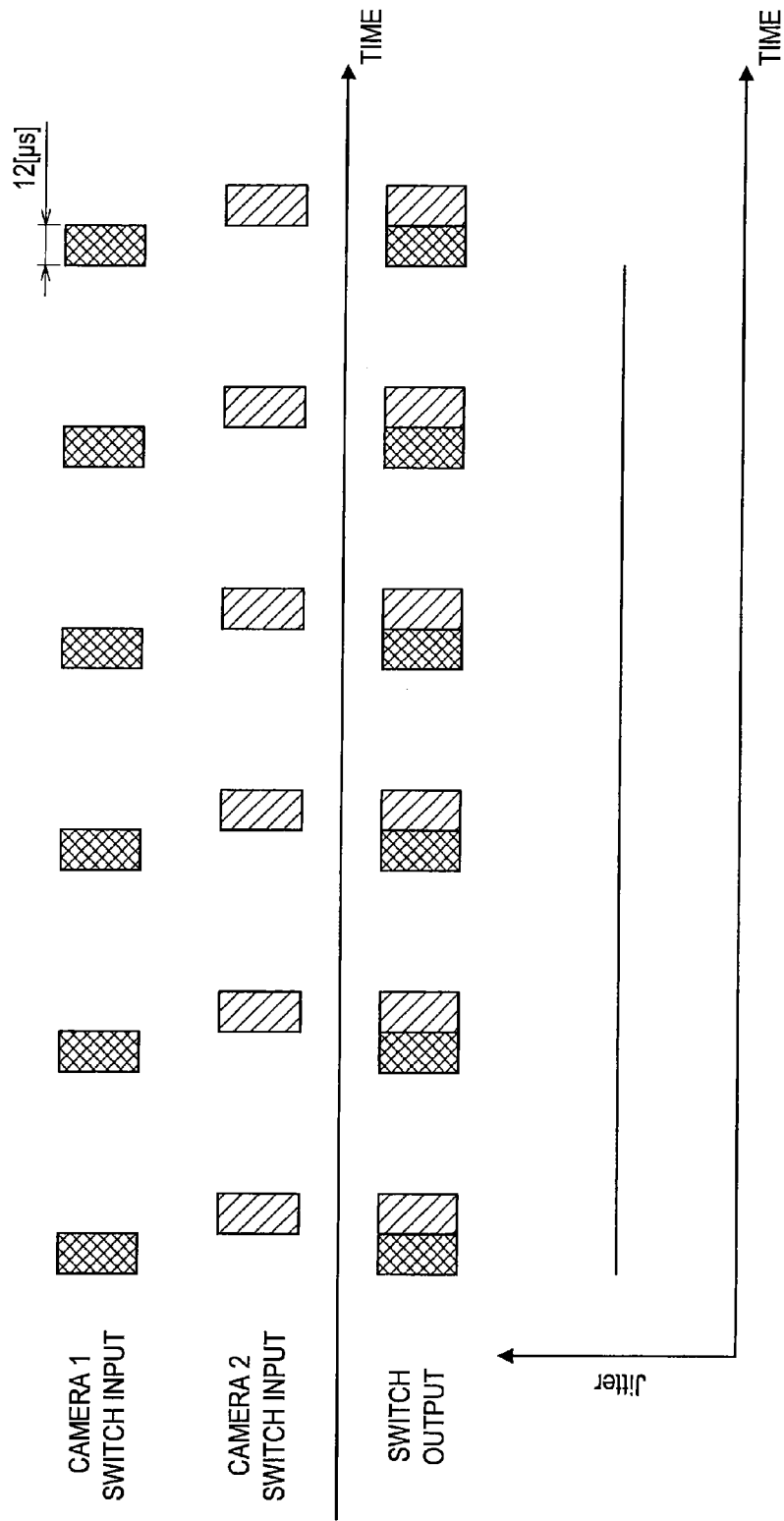
FIG. 3 is a timing chart showing an example in which priorities are provided among a plurality of cameras.

In order to reduce jitter, in this embodiment, priorities are provided among the packet transmission timings of a plurality of cameras. FIG. 3 is a timing chart showing an example in which priorities are provided among a plurality of cameras. In FIG. 3, the camera (1) 200 is prioritized, and the packet transmission timing of the camera (2) 300 is delayed than the packet transmission timing of the camera (1) 200 by 12 µs.

Accordingly, the network switch 130 always receives packets from the camera (1) 200 first, and receives packets from the camera (2) 300 second. Therefore, the network switch 130 can always collectively output packets in the following order: the camera (1) 200 the camera (2) 300. Thus, the packet transmission of the camera (1) 200 and the camera (2) 300 becomes smooth, and it is thus possible to surely reduce network jitter.

Although FIG. 1 shows a configuration in which a synchronization signal is sent from the reference signal source 140 to each of the cameras 200 and 300 and the camera receiver 400, each embodiment described below is based on the assumption that a synchronization signal is transmitted using a video signal line.

1-3. Exemplary Configuration of Camera

Figure 4:
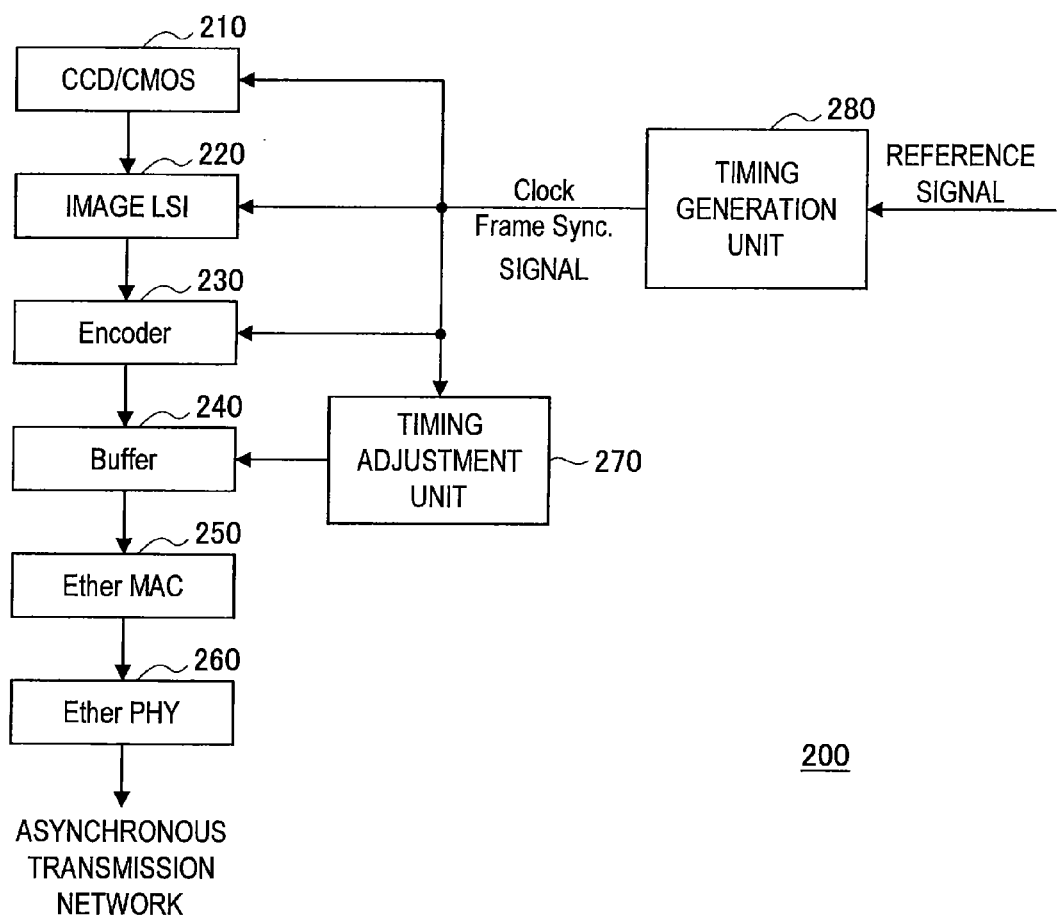
FIG. 4 is a block diagram showing the configuration of the camera (1) for implementing the packet transmission timing shown in FIG. 3.

FIG. 4 is a block diagram showing the configuration of the camera (1) 200 for implementing the packet transmission timing shown in FIG. 3. Herein, the configuration of the camera (1) 200 will be described as an example. However, the same is true for the configuration of the camera (2) 300.

As shown in FIG. 4, the camera (1) 200 includes an image sensor 210 such as a CCD or a CMOS, an image LSI 220, an encoder 230, a buffer 240, an Ether MAC 250, an Ether PHY 260, a timing adjustment unit 270, and a timing generation unit 280. Each component shown in FIG. 4 may be configured by a circuit (hardware) or by a CPU (Central Processing Unit) and a program (software) for causing the CPU to function. In such a case, the program can be stored in a storage medium such as memory of the camera (1) 200 or a storage medium connected from the outside.

Video data captured from the image sensor 210 is processed by the image LSI 220, and is encoded by the encoder 230 so that the data has a format adapted to network transmission, and thus is packetized.

Herein, the operation timings of the image sensor 210, the image LSI 220, and the encoder 230 are determined by a frame synchronization signal (Frame Sync.) and a clock generated from a reference signal. This operation timing is generated by the timing generation unit 280. The timing of the frame synchronization signal in each of the cameras 200 and 300 is advanced in accordance with a delay in the transmission channel and a delay in the encoder 230, and is set to a timing that is earlier than a frame synchronization signal in the camera receiver 400. Accordingly, the camera receiver 400 can obtain a decoded video that is synchronized with the frame synchronization signal in the camera receiver 400 without being influenced by the delay in the transmission channel or the delay in the encoder 230. In the first embodiment, it is assumed that the advance amount of the frame synchronization signal is a fixed value.

Specifically, synchronized clocks are generated in the cameras (the camera (1) 200 and the camera (2) 300) on the basis of reference signals sent from the reference signal source 140. A frame synchronization signal is generated on the basis of a clock. In addition, as described above, the timings of frame synchronization signals in the cameras 200 and 300 are advanced in accordance with delays in the transmission channels or the like. Thus, the operation timing determined by the frame synchronization signal generated in the timing generation unit 280 is advanced with respect to the reference clock by a delay in the transmission channel or the like. Each component such as the image sensor 210, the image LSI 220, and the encoder 230 is controlled based on the clock and the frame synchronization signal.

The timing adjustment unit 270 determines, on the basis of the frame synchronization signal, the packet transmission timing at the camera (1) 200. FIG. 4 shows an example in which the timing is fixedly set by the timing adjustment unit 270. For example, the timing adjustment unit 270 performs on the buffer 240 setting for starting transmission of an initial packet of a frame 50 μs later than the timing of the frame synchronization signal. This set value (50 μs) can also be set by a user by directly operating a console of the camera or the like.

The buffer 240 is provided to absorb (adjust) the time until when a packet output from the encoder 230 is input to the Ether MAC 250. The timing adjustment unit 270 notifies the buffer 240 of the aforementioned timing of transmission of an initial packet of a frame to the Ether MAC 250. That is, in the aforementioned example, the timing of when an initial packet of a frame is output from the buffer 240 is set to 50 μs later than the timing of the frame synchronization signal.

The packet signal is, after being subjected to predetermined procedures in the Ether MAC 250, processed by the Ether PHY 260 and is output to the network. The Ether MAC 250 adds control information such as a transmission destination address to the packet, and transmits data in units of a MAC frame. The Ether PHY 260 transmits data to the transmission network 500 in accordance with a physical connection/transmission scheme of the network.

As described above, the timing of packet transmission from the buffer 240 to the Ether MAC 250 is set in accordance with the timing noticed by the timing adjustment unit 270. Thus, by changing the timing of notification from the timing adjusting unit 270 to the buffer 240, it becomes possible to change the packet transmission timing at the camera (1) 200 with respect to the packet transmission timing at the camera (2) 300.

Accordingly, as the timing adjustment unit 270 of the camera (2) 300 notices the packet transmission timing that is delayed than the frame synchronization signal by 12 μs, it becomes possible to always delay the packet transmission timing at the camera (2) 300 with respect to the packet transmission timing at the camera (1) 200. Thus, as shown in FIG. 3, it is possible to delay the packet transmission timing at the camera (2) 300 with respect to the transmission timing at the camera (1) 200 by 12 μs. Note that the shift amount of the packet transmission timing is not limited to 12 μs, and may be any given value.

Although an example in which Ethernet is used is shown as a transmission scheme, the process can be similarly performed using other packet transmission schemes. In addition, although this embodiment describes an example in which an image is compressed through encoding, the process can be similarly performed even when an uncompressed video signal is used.

Although the aforementioned example describes a case where the priority of the camera (1) 200 is higher than that of the camera (2) 300, the priority can be adequately set in accordance with various parameters.

As described above, according to this embodiment, in a video transmission system that uses an asynchronous packet transmission scheme such as Ethernet, it is possible to optimally disperse the transmission timings for packets output from a plurality of synchronized cameras. Accordingly, as a collision of packets in the network switch 130 can be surely suppressed, it is possible to suppress jitter to the minimum.

In addition, even when an expensive network switch having a packet prioritization control function or the like is not provided, similar effect is expected. In addition, as the setting of such network switch is generally complex and difficult, the burden for the user can be reduced.

As the jitter can be suppressed to the minimum, a video buffer can be reduced by that amount. Thus, a system delay can be reduced. Further, dispersing packets means averaging instantaneous throughput. Thus, it is also possible to increase the number of cameras that can be accommodated in the network system.

2. Second Embodiment

2-1. Summary of Second Embodiment

The first embodiment has described an example in which a user fixedly sets the packet signal transmission timing with the timing adjustment unit 270. The second embodiment shows an example in which the camera receiver 400 transmits the packet signal transmission timing to each of the cameras 200 and 300, and on the basis of the transmitted timing, each of the cameras 200 and 300 sets the packet signal transmission timing. According to such a configuration, it is possible to dynamically set the packet transmission timing at each of the cameras 200 and 300 on the basis of jitter or a network delay measured on the camera receiver 400 side.

Specifically, each of the camera (1) 200 and the camera (2) 300 receives from the camera receiver 400 a control signal PHS indicating the advance amount for adjusting a frame synchronization signal, and a control signal for controlling the packet transmission timing. The control information PHS indicating the advance amount of a frame synchronization signal is set in accordance with a delay amount that is necessary for transmission on the network and is acquired on the camera receiver 400 side. As a delay amount in the network is larger, it is possible to, by setting the advance amount of a frame synchronization signal to be large, prevent a delay of the timing of when a packet signal of a video arrives at the camera receiver 400, and thus compensate for a delay in the network. The control information indicating the advance amount of a frame synchronization signal is sent to the timing generation unit 280, so that the timing of the frame synchronization signal on each of the camera 200 and 300 side is adjusted.

The control information for controlling the packet transmission timing is set on the basis of the jitter measured on the camera receiver 400 side. Control is performed so that the packet transmission timing is shifted as the jitter is larger. The control information for controlling the packet transmission timing is sent to the cameras 200 and 300 from the camera receiver 400. The control information for controlling the packet transmission timing is processed by the timing adjustment unit 270, so that the timing of a packet signal transmitted from the buffer 204 is adjusted.

2-2. Exemplary Configuration of Camera

Figure 5:
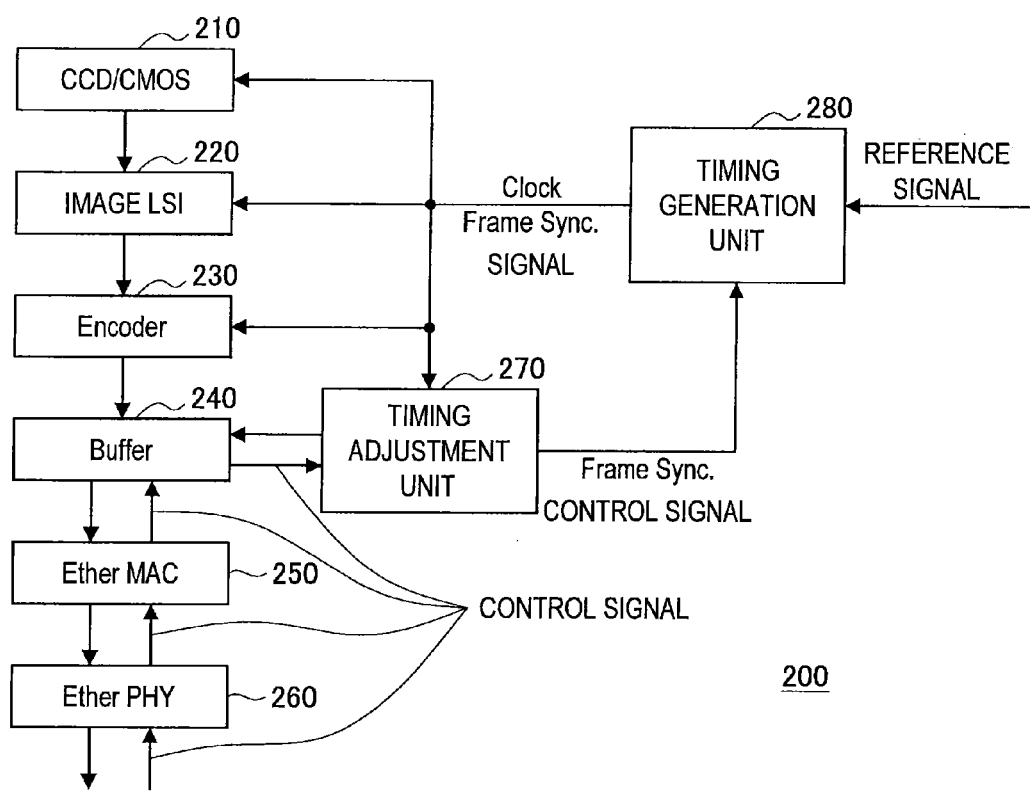
FIG. 5 is a block diagram showing the configuration of a camera in accordance with the second embodiment.

FIG. 5 is a block diagram showing the configuration of each of the cameras 200 and 300 in accordance with the second embodiment. The basic configuration is the same as that in the first embodiment shown in FIG. 4. However, in the second embodiment, both the control signal for controlling the packet transmission timing and control information indicating the advance amount of a frame synchronization signal are sent from the camera receiver 400. The control signal for controlling the packet transmission timing and the control information indicating the advance amount of a frame synchronization signal are received via the Ether PHY 260 and the Ether MAC 250, and are sent to the buffer 240. Note that each component shown in FIG. 5 can also be configured by a circuit (hardware) or by a CPU (Central Processing Unit) and a program (software) for causing the CPU to function. In such a case, the program can be stored in a storage medium such as memory of the camera (1) 200 or a storage medium connected from the outside.

Then, the control signal for controlling the packet transmission timing is sent to the timing adjustment unit 270 from the buffer 240. In addition, the control information indicating the advance amount of a frame synchronization signal is sent from the buffer 240 to the timing adjustment unit 270, and is further sent to the timing generation unit 280.

Accordingly, the timing adjustment unit 270 can dynamically adjust the timing of a packet signal to be sent from the buffer 240 to the Ether MAC 250 on the basis of the control signal indicting the transmission timing sent from the camera receiver 400 side. In addition, the timing generation unit 280 can generate a frame synchronization signal with a dynamically changed advance amount on the basis of the control information indicating the advance amount of the frame synchronization signal.

Thus, as the timing adjustment unit 270 controls the transmission timing for a packet from the buffer 240 to the Ether MAC 250, it is possible to surely suppress generation of jitter due to packets being transmitted at the same timing as described with reference to FIG. 1, in accordance with the jitter acquired on the camera receiver 400 side.

In addition, as the timing generation unit 280 generates a frame synchronization signal on the basis of the control signal indicating the advance amount of the frame synchronization signal, it is possible to dynamically compensate for the delay amount that changes in accordance with the condition of the transmission channel.

Thus, according to the second embodiment, it is possible to dynamically compensate for a delay that is generated in accordance with the condition of the transmission channel and is generated when a video frame arrives at the camera receiver 400. In addition, it is possible to, by dynamically adjusting the packet transmission timing on the basis of the control information for the packet transmission timing sent from the camera receiver 400, surely suppress jitter caused by collision of packet signals transmitted form the network switch 130 to the camera receiver 400.

2-3. Exemplary Configuration of Camera Receiver

Figure 6:
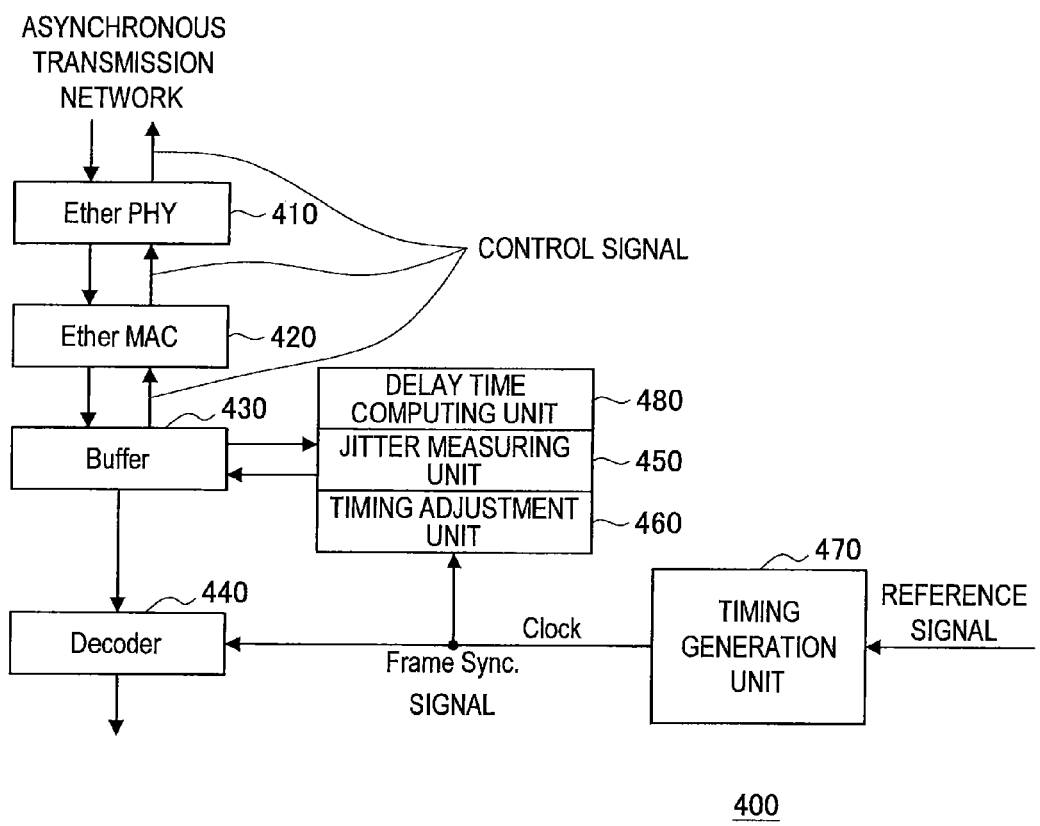
FIG. 6 is a schematic diagram showing the configuration of a camera receiver.

In the second embodiment, control information for controlling the packet transmission timing and control information indicating the advance amount of a frame synchronization signal are sent from the camera receiver 400 to the cameras 200 and 300. Therefore, the camera receiver 400 includes a component that acquires such control information. FIG. 6 is a schematic diagram showing the configuration of the camera receiver 400. The camera receiver 400 decodes video data or the like of each camera input from the video switcher 130. As shown in FIG. 6, the camera receiver 400 includes an Ether PHY 410, an Ether MAC 420, a buffer 430, a decoder 440, a jitter measuring unit 450, a timing adjustment unit 460, a timing generation unit 470, and a delay time computing unit 480. Each component shown in FIG. 6 can be configured by a circuit (hardware) or by a CPU (Central Processing Unit) and a program (software) for causing the CPU to function. In such a case, the program can be stored in a storage medium such as memory of the camera receiver 400 or a storage medium connected from the outside.

An A/V packet and a control packet received from the network are input to the buffer 430 for absorbing jitter via the Ether PHY 410 and the Ether MAC 420. The jitter measuring unit 450 measures the amount of jitter in each of the cameras 200 and 300 in the buffer 430. Each of the cameras 200 and 300 and the camera receiver 400 are synchronized by reference signals. Thus, the jitter measuring unit 450 can measure the amount of jitter in each of the cameras 200 and 300 on the basis of the time information (time stamp) added to the packet on the camera side. The timing adjustment unit 460 computes optimum packet transmission timing at each of the cameras 200 and 300 on the basis of the jitter amount in each of the cameras 200 and 300. The result of computation of the optimum packet transmission timing at each of the cameras 200 and 300 is transmitted to the cameras 200 and 300, and the result of the feedback is monitored. Accordingly, a feedback loop is formed.

The camera receiver 400 performs, regarding the relationship between the "jitter amount" measured by the jitter measuring unit 450 and the "optimum packet transmission timing at each of the cameras 200 and 300" a process of "varying the packet transmission timings of the cameras 200 and 300" if the "jitter amount" is large. Therefore, the camera receiver 400 generates control information for controlling the packet transmission timing on the basis of the "jitter amount" measured by the jitter measuring unit 450, and transmits the control information to the cameras 200 and 300 via the buffer 430, the Ether MAC 420, and the Ether PHY.

In addition, the delay time computing unit 480 computes the amount of transmission delays in the asynchronous transmission network 500, and generates a control signal indicating the advance amount of a frame synchronization signal in each of the cameras 200 and 300 on the basis of the amount of transmission delays. The control signal indicating the advance amount of a frame synchronization signal is sent to the asynchronous transmission network 500 via the buffer 430, the Ether MAC, and the Ether PHY 410, and is sent to each of the cameras 200 and 300.

In the second embodiment, it is also possible to provide a configuration in which jitter measurement or a feedback loop is not performed, but the packet transmission timings of the cameras 200 and 300 are fixedly specified on the camera receiver 400 side. That is, a user may fixedly specify that "the packet transmission timing at the camera (2) 300 should always be delayed by 24 μs from the packet transmission timing at the camera (1) 200."

In this embodiment, a scheme that uses video signal lines for the transmission of synchronization signals has been described. However, a similar configuration can also be used for a system in which synchronization is achieved by directly connecting synchronization signal lines from the reference signal source 140 to the cameras 200 and 300 as shown in FIG. 1.

2-4. Process of Feedback Loop in Camera Receiver

Next, a process of a feedback loop in the camera receiver 400 will be described. FIG. 7 is a flowchart showing an algorithm of a feedback loop. In FIG. 7, the priority of each of the cameras 200 and 300 is determined in accordance with the transmission amount of each camera. First, in step S10, it is determined if the jitter measured by the jitter measuring unit 450 is greater than a predetermined threshold, and if the measured jitter is determined to be greater than the threshold, the flow proceeds to step S12. In step S12, the A/V transmission amount of the camera (1) 200 and that of the camera (2) 300 are compared. If the jitter is less than or equal to the threshold, the process enters a standby mode in step S10.

In the next step S14, it is determined if the transmission amount of the camera (1) 200 is larger than that of the camera (2) 300. If the transmission amount of the camera (1) 200 is determined to be larger than that of the camera (2) 300, the process proceeds to step S16. In step S16, the camera (1) with a larger transmission amount is prioritized over the camera (2) 300, and the packet transmission timing at the camera (2) 300 is delayed by 12 μs.

In the next step S18, it is determined if the jitter has become less than a predetermined threshold. If the jitter is determined to have become less than the predetermined threshold, the process returns to start. Meanwhile, if the jitter is not determined to have become less than the predetermined threshold, the process proceeds to step S20.

In step S20, it is determined if the total timing delay amount of the camera (2) 300 is 50 μs or less. If the total timing delay amount is determined to be 50 μs or less, the process proceeds to step S22. In step S22, the packet transmission timing at the camera (2) 300 is further delayed by 5 μs, and the process returns to step S18. If the total timing delay amount is determined to be larger than 50 μs in step S20, the process returns to start.

Meanwhile, if the transmission amount of the camera (1) 200 is not determined to be larger than that of the camera (2) 300 in step S14, the process proceeds to step S24. In step S24, the camera (2) 300 is prioritized over the camera (1) 200, and the packet transmission timing at the camera (1) 200 is delayed by 12 μs.

In the next step S26, it is determined if the jitter has become less than a predetermined threshold. If the jitter is determined to have become less than the predetermined threshold, the process returns to start. Meanwhile, if the jitter is not determined to have become less than the predetermined threshold, the process proceeds to step S28.

In step S28, it is determined if the total timing delay amount of the camera (1) 200 is 50 μs or less. If the total timing delay amount is determined to be 50 μs or less, the process proceeds to step S30. In step S30, the packet transmission timing at the camera (1) 200 is further delayed by 5 μs, and the process returns to step S26. If the total timing delay amount is determined to be larger than 50 μs in step S28, the process returns to start.

2-5. Method of Determining Priorities

In the determination (step S14) of which of the camera (1) 200 and the camera (2) 300 should be prioritized in the process of FIG. 7, it is determined that the priority of the camera with a larger transmission amount is higher. However, the determination of the priorities is not limited thereto. Hereinafter, a method of determining the priorities of the cameras 200 and 300 will be described.

For example, a camera to be prioritized may be determined in accordance with the priorities of the cameras specified in advance by a user. Specifically, the priorities of the cameras may be fixedly set through an input of a user from a console of each camera. In addition, the priority of a camera with a smaller network jitter may be set high as a criterion for determining the priorities of the cameras.

Alternatively, as a criterion for determining the priorities of the cameras, it is also possible to set the priority of a camera with a smaller transmission delay to be high.

2-6. Dispersion Amount of Packet Transmission Timings

Further, in determining the dispersion amount for dispersing the transmission timings for packets output from a plurality of cameras, the dispersion amount may be determined using the measured jitter value of the network. For example, when the measured jitter value of the network is relatively small, the delay amount of the packet transmission timing at one camera with respect to the packet transmission timing at the other camera may be set to 12 μm, and when the measured jitter value of the network is relatively large, the delay amount of the packet transmission timing at the other camera with respect to the packet transmission timing at the one camera may be set to 24 μm, for example.

Likewise, in determining the dispersion amount for dispersing the transmission timings for packets output from a plurality of cameras, it is also possible to use a measured network delay value. For example, when the measured network delay value is relatively small, the delay amount of the packet transmission timing at one camera with respect to the packet transmission timing at the other camera may be set to 12 μm, and when the measured network delay value is relatively large, the delay amount of the packet transmission timing at the other camera with respect to the packet transmission timing at the one camera may be set to 24 μm, for example.

As described above, according to the second embodiment, the packet transmission timing can be adjusted on the basis of a control signal sent from the camera receiver 400 side. Thus, it is possible to surely suppress generation of jitter caused by simultaneous transmission of packet signals from a plurality of cameras. In addition, as the advance amount of a frame synchronization signal can be controlled on the basis of a dynamic change in the delay amount due to a transmission channel or a buffer, it is possible to surely suppress a delay of a packet signal.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Note that the present technology may also be configured as below.

(1) A transmitting device comprising:
a packet signal generation unit configured to generate a packet signal of a video;
a transmitting unit configured to transmit the packet signal via an asynchronous transmission network;
a timing generation unit configured to generate a video frame synchronization signal on the basis of a reference signal acquired from a reference signal source; and
a timing adjustment unit configured to, on the basis of the frame synchronization signal, perform adjustment so that a transmission timing for the packet signal is different from a transmission timing for a packet signal at another transmitting device.

(2) The transmitting device according to (1), wherein the timing adjustment unit adjusts the transmission timing for the packet signal on the basis of a control signal sent from a receiving device that receives the packet signal, the control signal indicating the transmission timing for the packet signal.

(3) The transmitting device according to (1), wherein the transmission timing is a timing determined on the basis of a jitter in the asynchronous transmission network.

(4) The transmitting device according to (1), wherein the timing generation unit generates the frame synchronization on the basis of an advance amount of the frame synchronization signal sent from the receiving device that receives the packet signal.

(5) The transmitting device according to (4), wherein the advance amount is a value determined on the basis of a transmission delay amount in the asynchronous transmission network.

(6) The transmitting device according to (1), wherein the timing adjustment unit performs adjustment so that the transmission timing for the packet signal is different from a transmission timing for a packet signal at another transmitting device in accordance with preset priorities.

(7) The transmitting device according to (1), wherein the timing adjustment unit performs adjustment so that the transmission timing for the packet signal is different from a transmission timing for a packet signal at another transmitting device in accordance with priorities set on the basis of jitter in the asynchronous transmission network.

(8) The transmitting device according to (1), wherein the timing adjustment unit performs adjustment so that the transmission timing for the packet signal is different from a transmission timing for a packet signal at another transmitting device in accordance with priorities set on the basis of a transmission amount in the asynchronous transmission network.

(9) The transmitting device according to (1), wherein the timing adjustment unit performs adjustment so that the transmission timing for the packet signal is different from a transmission timing for a packet signal at another transmitting device in accordance with priorities set on the basis of a transmission delay in the asynchronous transmission network.

(10) A receiving device comprising:
a receiving unit configured to receive a packet signal of a video via an asynchronous transmission network;
a jitter measuring unit configured to measure jitter of the packet signal in the asynchronous transmission network;
a timing adjustment unit configured to generate, on the basis of the jitter, a control signal for performing adjustment so that a transmission timing for the packet signal at a transmitting device that transmits the packet signal is different from a transmission timing at another transmitting device; and
a transmitting unit configured to transmit the control signal to the transmitting device.

(11) The receiving device according to (10), wherein the timing adjustment unit generates the control signal so that as the jitter is larger, an amount of adjustment of the transmission timing at the transmitting device is larger.

(12) The receiving device according to (10), further comprising a delay time computing unit configured to compute a transmission delay time in the asynchronous transmission network, wherein the receiving device transmits a control signal to the transmitting device for advancing a frame synchronization signal of the transmitting device in accordance with the delay time.

(13) The receiving device according to (10), wherein the timing adjustment unit generates a control signal for adjusting the transmission timing for the packet signal at each of the plurality of transmitting devices in accordance with predetermined priorities.

(14) The receiving device according to (13), wherein the priorities are set on the basis of one of jitter in the asynchronous transmission network, a transmission amount in the asynchronous transmission network, or a transmission delay in the asynchronous transmission network.

(15) The receiving device according to (10), wherein the receiving device does not transmit the control signal when a total delay amount of the transmission timing for the packet signal at the transmitting device is greater than or equal to a predetermined threshold.

(16) A communication system comprising:
a plurality of transmitting devices, each transmitting device including a packet signal generation unit configured to generate a packet signal of a video, a transmitting unit configured to transmit the packet signal via an asynchronous transmission network, a timing generation unit configured to generate a video frame synchronization signal on the basis of a reference signal acquired form a reference signal source, and a timing adjustment unit configured to perform adjustment so that a transmission timing for the packet signal is different from a transmission timing for a packet signal at another transmitting device on the basis of the frame synchronization signal;

a switch configured to receive the packet signals transmitted from the plurality of transmitting devices and transmit the received packet signals via a single cable; and a receiving device including a receiving unit configured to receive the packet signals transmitted from the switch.

(17) A transmission method comprising:
generating a packet signal of a video;
transmitting the packet signal via an asynchronous transmission network;
generating a video frame synchronization signal on the basis of a reference signal acquired from a reference signal source; and
performing adjustment so that a transmission timing for the packet signal is different from a transmission timing for a packet signal at another transmitting device on the basis of the frame synchronization signal.

(18) A program for causing a computer to function as:
means for generating a packet signal of a video;
means for transmitting the packet signal via an asynchronous transmission network;
means for generating a video frame synchronization signal on the basis of a reference signal acquired from a reference signal source; and
means for performing adjustment so that a transmission timing for the packet signal is different from a transmission timing for a packet signal at another transmitting device on the basis of the frame synchronization signal.

(19) A receiving method comprising:
receiving a packet signal of a video via an asynchronous transmission network;
measuring jitter of the packet signal in the asynchronous transmission network;
generating a control signal for performing adjustment so that a transmission timing for the packet signal at the transmitting device that transmits the packet signal is different from a transmission timing at another transmitting device; and
transmitting the control signal to the transmitting device.

(20) A program for causing a computer to function as:
means for receiving a packet signal of a video via an asynchronous transmission network;
means for measuring jitter of the packet signal in the asynchronous transmission network;
means for generating a control signal for performing adjustment so that a transmission timing for the packet signal at the transmitting device that transmits the packet signal is different from a transmission timing at another transmitting device; and
means for transmitting the control signal to the transmitting device.

The present disclosure contains subject matter related to that disclosed in Japanese Priority Patent Application JP 2011-197258 filed in the Japan Patent Office on Sep. 9, 2011, the entire content of which is hereby incorporated by reference.

What is claimed is:

1. A transmitting device comprising:
circuitry configured to
generate a packet signal of a video;
transmit the packet signal via an asynchronous transmission network;
generate a video frame synchronization signal on the basis of a reference signal acquired from a reference signal source; and
on the basis of the frame synchronization signal, perform adjustment so that a transmission timing for the packet signal is different from a transmission timing for a packet signal at an other transmitting device, wherein
the circuitry adjusts the transmission timing for the packet signal on the basis of a first control signal sent from a receiving device that receives the packet signal, the first control signal indicating the transmission timing for the packet signal, and the transmission timing being a timing determined on the basis of a jitter in the asynchronous transmission network between the transmitting device and the receiving device, and
the circuitry generates the frame synchronization signal on the basis of a second control signal indicating an advance amount of the frame synchronization signal sent from the receiving device, the advance amount being a value determined on the basis of a transmission delay amount in the asynchronous transmission network between the transmitting device and the receiving device.

2. The transmitting device according to claim 1, wherein the circuitry performs adjustment so that the transmission timing for the packet signal is different from a transmission timing for a packet signal at the other transmitting device in accordance with preset priorities.

3. The transmitting device according to claim 1, wherein the circuitry performs adjustment so that the transmission timing for the packet signal is different from a transmission timing for a packet signal at the other transmitting device in accordance with priorities set on the basis of jitter in the asynchronous transmission network.

4. The transmitting device according to claim 1, wherein the circuitry performs adjustment so that the transmission timing for the packet signal is different from a transmission timing for a packet signal at the other transmitting device in accordance with priorities set on the basis of a transmission amount in the asynchronous transmission network.

5. The transmitting device according to claim 1, wherein the circuitry performs adjustment so that the transmission timing for the packet signal is different from a transmission timing for a packet signal at the other transmitting device in accordance with priorities set on the basis of a transmission delay in the asynchronous transmission network.

6. A receiving device comprising:
circuitry configured to
receive a packet signal of a video via an asynchronous transmission network;
measure jitter of the packet signal in the asynchronous transmission network;
generate, on the basis of the jitter, a first control signal for performing adjustment so that a transmission timing for the packet signal at a transmitting device that transmits the packet signal is different from a transmission timing at an other transmitting device;
transmit the first control signal to the transmitting device, and
compute a transmission delay time in the asynchronous transmission network between the transmitting device and the receiving device, wherein
the circuitry generates the first control signal so that as the jitter increases, an amount of adjustment of the transmission timing at the transmitting device increases, and
the circuitry transmits a second control signal to the transmitting device for advancing a frame synchronization signal of the transmitting device in accordance with the transmission delay time.

7. The receiving device according to claim 6, wherein the circuitry generates the first control signal for adjusting the transmission timing for the packet signal at each of the plurality of transmitting devices in accordance with predetermined priorities.

8. The receiving device according to claim 7, wherein the priorities are set on the basis of one of jitter in the asynchronous transmission network, a transmission amount in the asynchronous transmission network, or a transmission delay in the asynchronous transmission network.

9. The receiving device according to claim 6, wherein the receiving device does not transmit the first control signal when a total delay amount of the transmission timing for the packet signal at the transmitting device is greater than or equal to a predetermined threshold.

10. A communication system comprising:
a plurality of transmitting devices, each transmitting device comprising first circuitry configured to
generate a packet signal of a video,
transmit the packet signal via an asynchronous transmission network,
generate a video frame synchronization signal on the basis of a reference signal acquired form a reference signal source, and
perform adjustment so that a transmission timing for the packet signal is different from a transmission timing for a packet signal at an other transmitting device on the basis of the frame synchronization signal, wherein
the first circuitry adjusts the transmission timing for the packet signal on the basis of a first control signal sent from a receiving device that receives the packet signal, the first control signal indicating the transmission timing for the packet signal, and the transmission timing being a timing determined on the basis of a jitter in the asynchronous transmission network between the transmitting device and the receiving device, and
the first circuitry generates the frame synchronization signal on the basis of a second control signal indicating an advance amount of the frame synchronization signal sent from the receiving device, the advance amount being a value determined on the basis of a transmission delay amount in the asynchronous transmission network between the transmitting device and the receiving device;
a switch configured to receive the packet signals transmitted from the plurality of transmitting devices and transmit the received packet signals via a single cable; and
the receiving device comprising second circuitry configured to receive the packet signals transmitted from the switch.

11. A transmission method comprising:
generating a packet signal of a video;
transmitting the packet signal via an asynchronous transmission network from a transmitting device to a receiving device;
generating a video frame synchronization signal on the basis of a reference signal acquired from a reference signal source; and
performing adjustment so that a transmission timing for the packet signal is different from a transmission timing for a packet signal at an other transmitting device on the basis of the frame synchronization signal by circuitry, wherein
the transmission timing for the packet signal is adjusted on the basis of a first control signal sent from a receiving device that receives the packet signal, the first control signal indicating the transmission timing for the packet signal, and the transmission timing being a timing determined on the basis of a jitter in the asynchronous transmission network between the transmitting device and the receiving device, and
the frame synchronization signal is generated on the basis of a second control signal indicating an advance amount of the frame synchronization signal sent from the receiving device, the advance amount being a value determined on the basis of a transmission delay amount in the asynchronous transmission network between the transmitting device and the receiving device.

12. A non-transitory computer readable medium including executable instructions, which when executed by a computer cause the computer to execute a transmission method, the transmission method comprising:
generating a packet signal of a video;
transmitting the packet signal via an asynchronous transmission network from a transmitting device to a receiving device;
generating a video frame synchronization signal on the basis of a reference signal acquired from a reference signal source; and
performing adjustment so that a transmission timing for the packet signal is different from a transmission timing for a packet signal at an other transmitting device on the basis of the frame synchronization signal, wherein
the transmission timing for the packet signal is adjusted on the basis of a first control signal sent from a receiving device that receives the packet signal, the first control signal indicating the transmission timing for the packet signal, and the transmission timing being a timing determined on the basis of a jitter in the asynchronous transmission network between the transmitting device and the receiving device, and
the frame synchronization signal is generated on the basis of a second control signal indicating an advance amount of the frame synchronization signal sent from the receiving device, the advance amount being a value determined on the basis of a transmission delay amount in the asynchronous transmission network between the transmitting device and the receiving device.

13. A receiving method comprising:
receiving a packet signal of a video via an asynchronous transmission network transmitted from a transmitting device to a receiving device;
measuring jitter of the packet signal in the asynchronous transmission network;
generating a first control signal for performing adjustment so that a transmission timing for the packet signal at the transmitting device that transmits the packet signal is different from a transmission timing at an other transmitting device by circuitry, the first control signal being generated so that as the jitter increases, an amount of adjustment of the transmission timing at the transmitting device increases;
transmitting the first control signal to the transmitting device,
computing a transmission delay time in the asynchronous transmission network between the transmitting device and the receiving device, and
transmitting a second control signal to the transmitting device for advancing a frame synchronization signal of the transmitting device in accordance with the transmission delay time.

14. A non-transitory computer readable medium including executable instructions, which when executed by a computer cause a computer to execute a receiving method, the receiving method comprising:

receiving a packet signal of a video via an asynchronous transmission network;

measuring jitter of the packet signal in the asynchronous transmission network;

generating a first control signal for performing adjustment so that a transmission timing for the packet signal at the transmitting device that transmits the packet signal is different from a transmission timing at an other transmitting device, the first control signal being generated so that as the jitter increases, an amount of adjustment of the transmission timing at the transmitting increases;

transmitting the first control signal to the transmitting device, computing a transmission delay time in the asynchronous transmission network between the transmitting device and the receiving device, and transmitting a second control signal to the transmitting device for advancing a frame synchronization signal of the transmitting device in accordance with the transmission delay time.

15. The transmitting device according to claim 4, wherein the circuitry delays the transmission timing for the packet signal of the other device by a first predetermined amount of time when the circuitry determines the transmission amount of the transmitting device is more than the transmission amount of the other device.

16. The transmitting device according to claim 15, wherein the circuitry further delays the transmission timing for the packet signal of the other device by a second predetermined amount of time when the circuitry determines the jitter is less than a predetermined threshold and a total timing delay amount of the other device is less than a third predetermined amount of time.

* * * * *